US012400585B2

(12) United States Patent
Kim et al.

(10) Patent No.: US 12,400,585 B2
(45) Date of Patent: Aug. 26, 2025

(54) DISPLAY DEVICE AND METHOD FOR DRIVING THE SAME

(71) Applicant: SAMSUNG DISPLAY CO., LTD., Yongin-si (KR)

(72) Inventors: Dowon Kim, Yongin-si (KR); Min-Weun Kim, Yongin-si (KR); Ukrae Lee, Yongin-si (KR); Woonyong Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/775,140

(22) Filed: Jul. 17, 2024

(65) Prior Publication Data

US 2025/0148962 A1 May 8, 2025

(30) Foreign Application Priority Data

Nov. 7, 2023 (KR) ........................ 10-2023-0153041

(51) Int. Cl.
*G09G 3/32* (2016.01)

(52) U.S. Cl.
CPC ....... *G09G 3/32* (2013.01); *G09G 2300/0842* (2013.01); *G09G 2320/0233* (2013.01); *G09G 2320/0626* (2013.01); *G09G 2320/0673* (2013.01)

(58) Field of Classification Search
CPC ... G09G 2320/0626; G09G 2320/0233; G09G 3/32; G09G 2300/0842; G09G 2320/0673
See application file for complete search history.

(56) References Cited

U.S. PATENT DOCUMENTS

| | | | | |
|---|---|---|---|---|
| 7,623,141 B2 | 11/2009 | Brown et al. | | |
| 9,053,664 B2 | 6/2015 | Lee | | |
| 11,386,828 B2 | 7/2022 | Kim et al. | | |
| 2015/0084541 A1* | 3/2015 | Jung | .................... | H05B 45/395 315/291 |
| 2016/0329019 A1* | 11/2016 | An | ........................... | G09G 3/20 |

(Continued)

FOREIGN PATENT DOCUMENTS

| | | |
|---|---|---|
| KR | 10-2004-0019353 A | 3/2004 |
| KR | 10-1850994 B1 | 4/2018 |
| KR | 10-2020-0123331 A | 10/2020 |

(Continued)

*Primary Examiner* — Muhammad N Edun
(74) *Attorney, Agent, or Firm* — F. CHAU & ASSOCIATES, LLC

(57) ABSTRACT

A display device includes a driving controller determining whether a dimming value is within one of first and second ranges, compare, in response to determining of the dimming value being within the first range, the dimming value with a first value and operate, in response to a comparison result of the dimming value and the first value, in one of first and second modes, compare, in response to determining of the dimming value within the second range, the dimming value with a second value and operate, in response to a comparison result of the dimming value and the second value, in one of the first and second modes, output the light emitting control signal for adjusting a pulse width of the light emitting signal in the first mode, and output the output data signal by modifying the input image signal based on the dimming value in the second mode.

20 Claims, 12 Drawing Sheets

(56) References Cited

U.S. PATENT DOCUMENTS

| | | | | |
|---|---|---|---|---|
| 2023/0171858 | A1 * | 6/2023 | Han | H05B 45/48 |
| 2023/0316991 | A1 | 10/2023 | Kim et al. | |

FOREIGN PATENT DOCUMENTS

| | | | |
|---|---|---|---|
| KR | 10-2021-0004007 | A | 1/2021 |
| KR | 10-2021-0043046 | A | 4/2021 |
| KR | 10-2023-0143247 | A | 10/2023 |

* cited by examiner

DISPLAY DEVICE AND METHOD FOR DRIVING THE SAME

CROSS-REFERENCE TO RELATED APPLICATIONS

This application claims priority under 35 U.S.C. § 119 to Korean Patent Application No. 10-2023-0153041 filed on Nov. 7, 2023, in the Korean Intellectual Property Office, the disclosures of which are incorporated by reference herein in their entireties.

BACKGROUND

Embodiments of the present disclosure described herein relate to a display device and a method for driving the same, and more particularly, relate to a display device capable of improving display quality and a method for driving the same.

A display device includes a display panel and a panel driver. The display panel includes scan lines, data lines, and pixels. The panel driver includes a scan driver to apply a scan signal to scan lines and a data driver to apply a data signal to data lines. Each of the pixels may emit light with brightness corresponding to a data signal applied through a relevant data line in response to the scan signal applied through a relevant scan line.

A data driving circuit may convert a data signal into data signals corresponding to the grayscale levels using gamma voltages corresponding to a plurality of grayscale levels.

SUMMARY

Embodiments of the present disclosure described herein provide a display device capable of overcoming an issue of degrading display quality after dimming and a method for driving the same.

According to an aspect of the present disclosure, a display device includes a display panel, a driving controller configured to modify an input image signal, output an output data signal, and generate a light emitting control signal, a data driving circuit configured to convert the output data signal into a data signal based on a plurality of gamma voltages and apply the data signal to the display panel, and a light emitting driving circuit configured to provide a light emitting signal to the display panel in response to the light emitting control signal. The driving controller is configured to determine whether an input dimming code value is within one of a plurality of dimming ranges including a first dimming range and a second dimming range, compare, in response to determining of the input dimming code value being within the first dimming range, the input dimming code value with a first reference dimming code value and operate, in response to a comparison result of the input dimming code value and the first reference dimming code value, in one of a first brightness control mode and a second brightness control mode, compare, in response to determining of the input dimming code value within the second dimming range, the input dimming code value with a second reference dimming code value and operate, in response to a comparison result of the input dimming code value and the second reference dimming code value, in one of the first brightness control mode and the second brightness control mode, output the light emitting control signal for adjusting a pulse width of the light emitting signal in the first brightness control mode, and output the output data signal by modifying the input image signal based on the input dimming code value in the second brightness control mode.

According to an embodiment, the display device may further include a gamma voltage generator to generate the plurality of gamma voltages in response to a first voltage code value. The driving controller is configured to generate the first voltage code value based on the output data signal. The first voltage code value includes a bottom voltage code value for determining a voltage level of a first gamma reference voltage and a top voltage code value for determining a voltage level of a second gamma reference voltage. The plurality of gamma voltages are between the first gamma reference voltage and the second gamma reference voltage.

According to an embodiment, the driving controller may update the first voltage code value to a second voltage code value based on a difference between a highest dimming grayscale value of the output data signal with a preset highest reference grayscale value in the second brightness control mode.

According to an embodiment, the driving controller may update the first voltage code value to the second voltage code value in response to the difference between the highest dimming grayscale value and the highest reference grayscale value being greater than a preset reference difference.

According to an embodiment, the driving controller may maintain the voltage code value in response to the difference between the highest dimming grayscale value and the highest reference grayscale value being equal to or smaller than a preset reference difference.

According to an embodiment, the driving controller may output the light emitting control signal to generate the light emitting signal having a pulse width corresponding to the input dimming code value in the first brightness control mode.

According to an embodiment, the driving controller may operate in the first brightness control mode in response to the input dimming code value being smaller than the first reference dimming code value, and operate in the second brightness control mode in response to the input dimming code value being greater than or equal to the first reference dimming code value.

According to an embodiment, the driving controller may operate in the first brightness control mode in response to the input dimming code value being smaller than the second reference dimming code value, and operate in the second brightness control mode in response to the input dimming code value being greater than or equal to the second reference dimming code value.

According to an embodiment, the first reference dimming code value may be one of a plurality of dimming code values included in the first dimming range, and the second reference dimming code value may be one of a plurality of dimming code values included in the second dimming range.

According to an embodiment, the display panel may include a pixel to operate in response to the data signal and the light emitting signal.

According to an embodiment, the driving controller may include a controller to output input data obtained by converting the input image signal to the input data in grayscale and output the input dimming code value and a voltage code value, and a data converter to output the output data signal based on the input data and the input dimming code value.

According to an aspect of the present disclosure, a method of driving a display device includes determining whether an input dimming code value is within one of a plurality of dimming ranges including a first dimming range and a second dimming range, comparing, in response to determining of the input dimming code value being within the first dimming range, the input dimming code value with a first reference dimming code value, operating, in response to a comparison result between the input dimming code value and the first reference dimming code value, in one of a first brightness control mode and a second brightness control mode, comparing, in response to determining of the input dimming code value being within the second dimming range, the input dimming code value with a second reference dimming code value, and operating, in response to a comparison result between the input dimming code value and the second reference dimming code value, in one of the first brightness control mode and the second brightness control mode.

According to an embodiment, the method may further include generating a plurality of gamma voltages in response to a first voltage code value, and converting the output data signal into a data signal, based on the plurality of gamma voltages and providing the data signal to the display panel.

According to an embodiment, the method may further include updating the first voltage code value to a second voltage code value in response to a difference between a highest dimming grayscale value of the output data signal with a preset highest reference grayscale value being greater than a preset reference difference in the second brightness control mode.

According to an embodiment, the method may further include maintaining the first voltage code value in response to the difference between the highest dimming grayscale value and the preset highest reference grayscale value being equal to or smaller than the preset reference difference in the second brightness control mode.

According to an embodiment, the method may further include generating the light emitting signal having a pulse width corresponding to the input dimming code value in the first brightness control mode.

According to an embodiment, the operating in one of the first brightness control mode and the second brightness control mode in response to the comparison result between the input dimming code value and the first reference dimming code value may include operating in the first brightness control mode in response to the input dimming code value being smaller than the first reference dimming code value, and operating in the second brightness control mode in response to the input dimming code value being greater than or equal to the first reference dimming code value.

According to an embodiment, the operating in one of the first brightness control mode and the second brightness control mode in response to the comparison result between the input dimming code value and the second reference dimming code value may include operating in the first brightness control mode in response to the input dimming code value being smaller than the second reference dimming code value, and operating in the second brightness control mode in response to the input dimming code value being greater than or equal to the second reference dimming code value.

According to an embodiment, the first reference dimming code value may be one of a plurality of dimming code values included in the first dimming range, and the second reference dimming code value may be one of a plurality of dimming code values included in the second dimming range.

According to an embodiment, the display panel may include a pixel to operate in response to a data signal and the light emitting signal.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
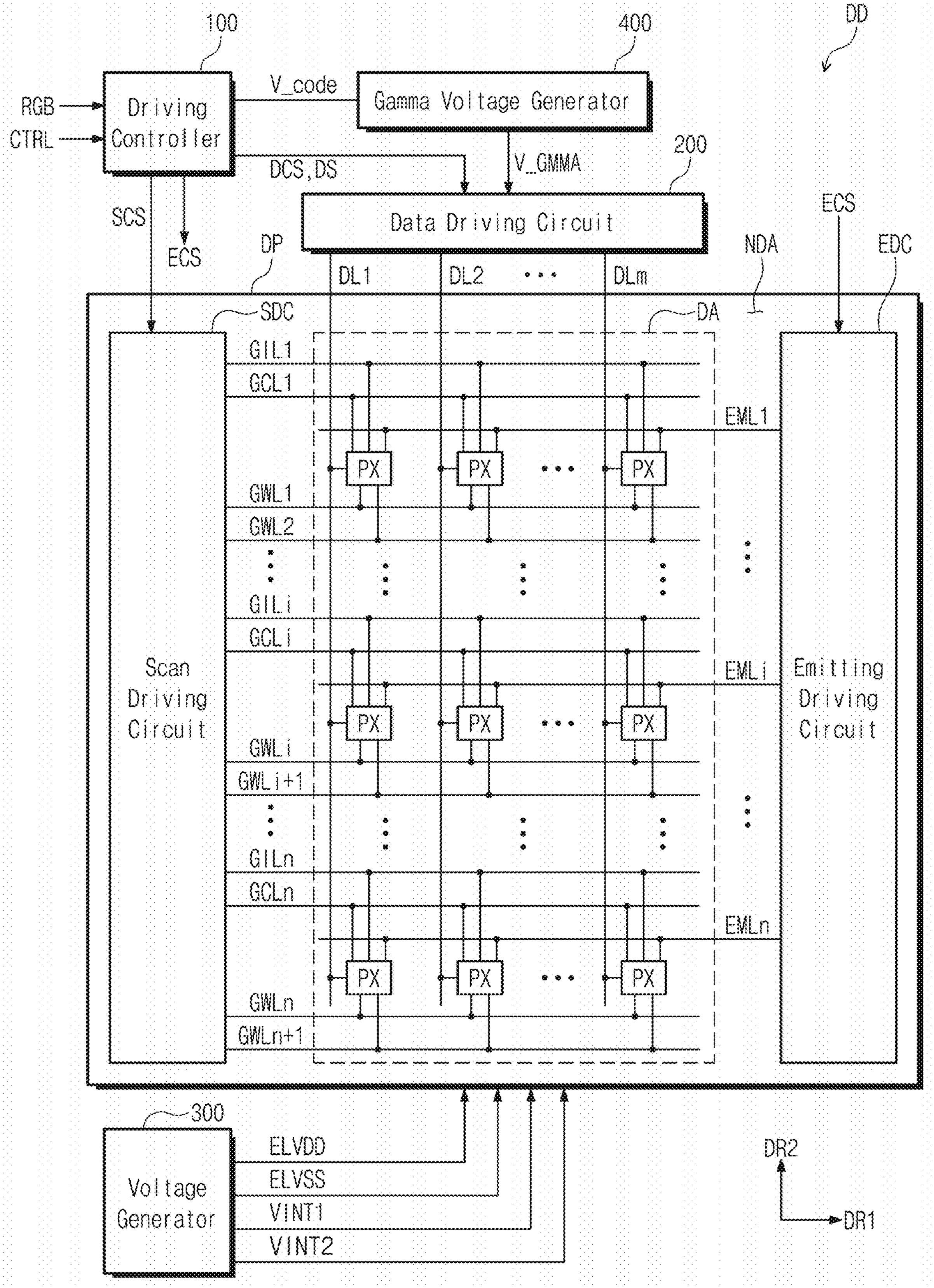
FIG. 1 is a block diagram of a display device according to an embodiment of the present disclosure.

In the specification, the expression that a first component (or region, layer, part, portion, etc.) is "on", "connected to", or "coupled to" a second component means that the first component is directly on, connected to, or coupled to the second component or means that a third component is interposed therebetween.

The same reference numeral will be assigned to the same component. In addition, in drawings, thicknesses, proportions, and dimensions of components may be exaggerated to describe the technical features effectively. The term "and/or" includes any and all combinations of one or more of associated components Although the terms first, second, etc. may be used herein to describe various components, these components should not be limited by these terms. These terms are used to distinguish one component from another component. For example, a first component discussed below could be termed a second component without departing from the technical scope of the present disclosure. Similarly, the second component could be termed the first component. The singular forms are intended to include the plural forms unless the context clearly indicates otherwise.

In addition, the terms "under", "at a lower portion", "above", "an upper portion" are used to describe the relationship between components illustrated in drawings. The terms are relative and are described with reference to a direction indicated in the drawing.

It will be further understood that the terms "comprises," "comprising," "includes," or "including," or "having" specify the presence of stated features, numbers, steps, operations, components, parts, or the combination thereof, but do not preclude the presence or addition of one or more other features, numbers, steps, operations, components, components, and/or the combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a block diagram illustrating a display device according to an embodiment of the present disclosure.

Referring to FIG. 1, a display device DD includes a display panel DP, a driving controller 100, a data driving circuit 200, a voltage generator 300, and a gamma voltage generator 400.

The driving controller 100 receives an input image signal RGB and a control signal CTRL. The driving controller 100 converts the image signal RGB into an output data signal DS and output the output data signal DS. The driving controller 100 may also output various signals such as a scan control signal SCS, a data control signal DCS, a light emitting control signal ECS, and a voltage code value V_code.

The gamma voltage generator 400 may generate a plurality of gamma voltages V_GMMA depending on the voltage code value V_code provided from the driving controller 100. The gamma voltage generator 400 may output the plurality of gamma voltages V_GMMA to the data driving circuit 200.

The data driving circuit 200 receives the data control signal DCS and the output data signal DS from the driving controller 100, and receives the plurality of gamma voltages V_GMMA from the gamma voltage generator 400. The data driving circuit 200 converts the output data signal DS into data signals, based on the plurality of gamma voltages V_GMMA, and then outputs the data signals to a plurality of data lines DLI to DLm to be described later.

The voltage generator 300 generates voltages for operating the display panel DP. According to an embodiment, the voltage generator 300 generates a first driving voltage ELVDD, a second driving voltage ELVSS, a first initialization voltage VINT1, and a second initialization voltage VINT2.

The display panel DP includes scan lines GIL1 to GILn, GCL1 to GCLn, and GWL1 to GWLn+1, light emitting lines EML1 to EMLn, the data lines DL1 to DLm, and pixels PX. The display panel DP may further include a scan driving circuit SDC and a light emitting driving circuit EDC. According to an embodiment, the scan driving circuit SDC may be disposed at a first side of the display panel DP. The scan lines GIL1 to GILn, GCL1 to GCLn, and GWL1 to GWLn+1 extend in a first direction DR1 from the scan driving circuit SDC.

The light emitting driving circuit EDC is disposed at a second side of the display panel DP. The light emitting lines EML1 to EMLn extend in a direction, which is opposite to the first direction DR1, from the light emitting driving circuit EDC.

The scan lines GIL1 to GILn, GCL1 to GCLn, and GWL1 to GWLn+1 and the light emitting lines EML1 to EMLn are arranged to be spaced from each other in a second direction DR2. The data lines DL1 to DLm extend in a direction opposite to the second direction DR2 from the data driving circuit 200, and may be arranged to be spaced apart from each other in the first direction DR1.

According to an embodiment illustrated in FIG. 1, the scan driving circuit SDC and the light emitting driving circuit EDC are arranged to face each other while the pixels PX are interposed between the scan driving circuit SDC and the light emitting driving circuit EDC. However, the present disclosure is not limited thereto. For example, the scan driving circuit SDC and the light emitting driving circuit EDC may be disposed to be adjacent to each other in a non-display region NDA of the display panel DP. According to an embodiment, the scan driving circuit SDC and the light emitting driving circuit EDC may be integrally implemented into one circuit. For example, the scan driving circuit SDC and the light emitting driving circuit EDC may be integrated into a single chip or a single package.

The plurality of pixels PX are electrically connected to the scan lines GIL1 to GILn, GCL1 to GCLn, and GWL1 to GWLn+1, the light emitting lines EML1 to EMLn, and the data lines DL1 to DLm. Each of the plurality of pixels PX may be electrically connected to four scan lines and one light emitting line. For example, as illustrated in FIG. 1, each of pixels in a first row may be connected to the scan lines GIL1, GCL1, GWL1, and GWL2 and the light emitting line EML1. Each of pixels in an i-th row may be connected to the scan lines GILi, GCLi, GWLi, and GWLi+1 and the light emitting line EMLi. Each of pixels in an N-th row may be connected to the scan lines GILn, GCLn, GWLn, and GWLn+1 and the light emitting line EMLn.

Each of the plurality of pixels PX may include a light emitting element ED (see FIG. 2) and a pixel circuit PXC (see FIG. 2) to control a light emitting operation of the light emitting element ED. The pixel circuit PXC may include at least one transistor and at least one capacitor. The scan driving circuit SDC and the light emitting driving circuit EDC may include transistors formed through the same process as a process for the pixel circuit PXC.

Each of the plurality of pixels PX receives the first driving voltage ELVDD, the second driving voltage ELVSS, the first initialization voltage VINT1, and the second initialization voltage VINT2 from the voltage generator 300.

The scan driving circuit SDC receives the scan control signal SCS from the driving controller 100. The scan driving circuit SDC may output scan signals to the scan lines GIL1 to GILn, GCL1 to GCLn, and GWL1 to GWLn+1, in response to the scan control signal SCS.

The light emitting driving circuit EDC receives the light emitting control signal ECS from the driving controller 100. The light emitting driving circuit EDC may output light emitting control signals to the light emitting lines EML1 to EMLn, in response to the light emitting control signal ECS. According to an embodiment, the light emitting driving circuit EDC may adjust pulse widths of the light emitting signals provided to the light emitting lines EML1 to EMLn, in response to the light emitting control signal ECS.

Figure 2:
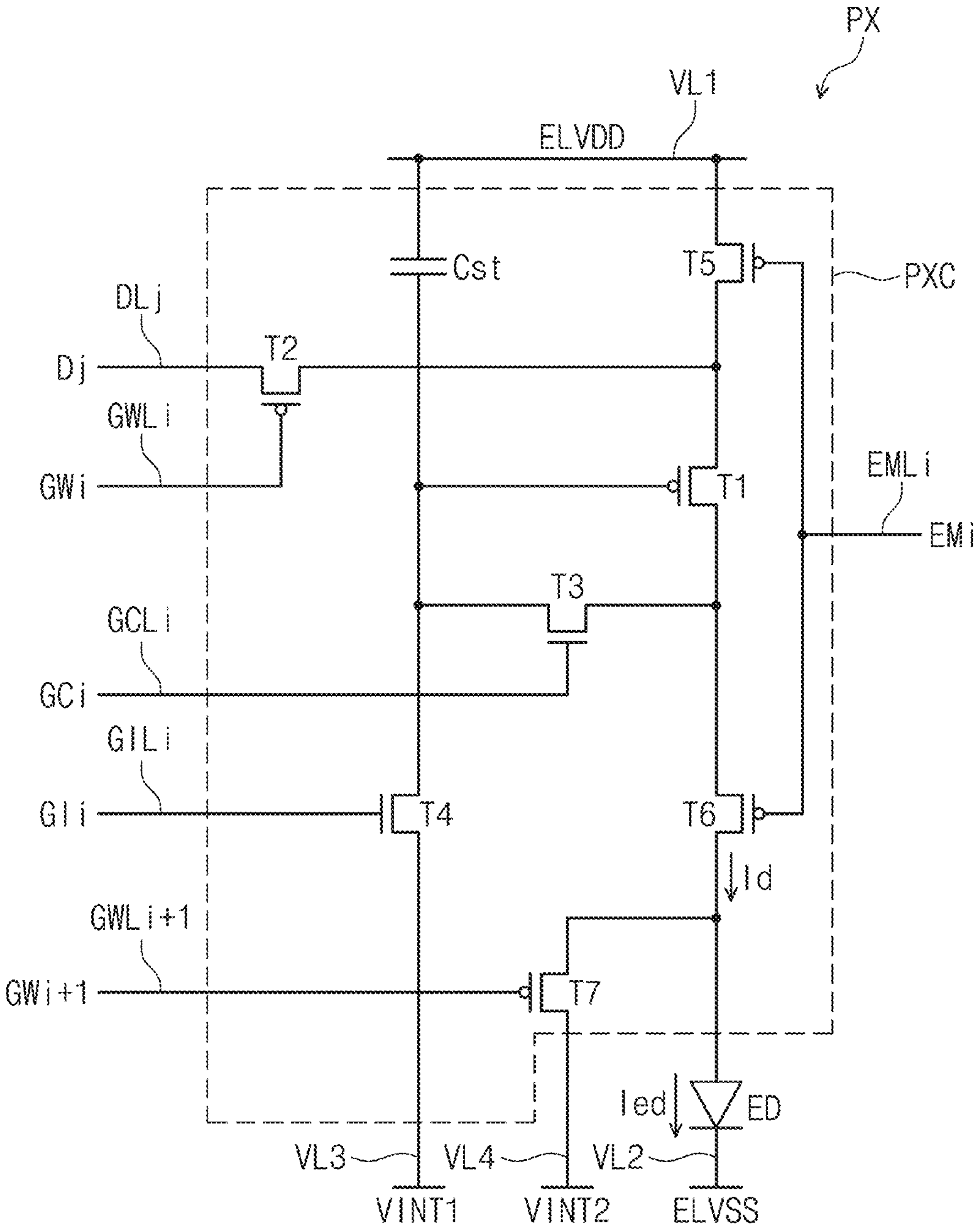
FIG. 2 is a circuit diagram of a pixel, according to an embodiment of the present disclosure.

FIG. 2 is a circuit diagram of a pixel according to an embodiment of the present disclosure.

FIG. 2 illustrates a pixel PX connected to a j-th data line DLj among the data lines DL1 to DLm illustrated in FIG. 1, i-th scan lines GILi, GCLi, and GWLi among the scan lines GIL1 to GILn, GCL1 to GCLn, and GWL1 to GWLn+1 illustrated in FIG. 1, and an i-th light emitting line EMLi among the light emitting lines EML1 to EMLn illustrated in FIG. 1.

Each of pixels PX illustrated in FIG. 1 may have the same circuit configuration as the pixel PX illustrated in FIG. 2.

Referring to FIG. 2, according to an embodiment, the pixel PX includes the pixel circuit PXC and at least one light emitting element ED. According to an embodiment, the light emitting element ED may be a light emitting diode. According to an embodiment, although the above description is made in that one pixel PX includes one light emitting element ED, the present disclosure is not particularly limited thereto. The pixel circuit PXC includes first to seventh transistors T1, T2, T3, T4, T5, T6, and T7 and a capacitor Cst.

According to an embodiment, the third and fourth transistors T3 and T4 among the first to seventh transistors T1 to T7 are N-type transistors including an oxide semiconductor serving as a semiconductor layer. Each of the first, second, fifth, sixth, and seventh transistors T1, T2, T5, T6, and T7 is a P-type transistor including a low-temperature polycrystalline silicon (LTPS) semiconductor layer. However, the present disclosure is not limited thereto, and all of the first to seventh transistors T1 to T7 may be P-type transistors or N-type transistors. According to an embodiment, at least one of the first to seventh transistors T1 to T7 may be an N-type transistor, and remaining transistors may be P-type transistors. In addition, the circuit configuration of the pixel according to an embodiment of the present disclosure is not limited to that illustrated in FIG. 2. The pixel circuit PXC illustrated in FIG. 2 is provided only for the illustrative purpose. For example, the configuration of the pixel circuit PXC may be modified.

The scan lines GILi, GCLi, GWLi, and GWLi+1 may be to transmit scan signals Gli, GCi, GWi, and GWi+1, respectively, and the light emitting line EMLi may be to transmit a light emitting signal EMi. The data line DLj transmits a data signal Dj. The data signal Dj may have a voltage level corresponding to the input image signal RGB which is input to the display device DD (see FIG. 1). First to fourth driving voltage lines VL1, VL2, VL3, and VL4 may transmit the first driving voltage ELVDD, the second driving voltage ELVSS, the first initialization voltage VINT1, and the second initialization voltage VINT2, respectively.

The first transistor T1 includes a first electrode connected to the first driving voltage line VL1 through the fifth transistor T5, a second electrode electrically connected to an anode of the light emitting element ED through the sixth transistor T6, and a gate electrode connected to a first terminal of the capacitor Cst. The first transistor T1 may receive the data signal Dj received through the data line DLj, in response to a switching operation of the second transistor T2 and may apply a driving current Id to the light emitting element ED.

The second transistor T2 includes a first electrode connected to the data line DLj, a second electrode connected to the first electrode of the first transistor T1, and a gate electrode connected to the scan line GWLi. The second transistor T2 may be turned on in response to the scan signal GWi received through the scan line GWLi and may transmit the data signal Dj received through the data line DLj to the first electrode of the first transistor T1.

The third transistor T3 includes a first electrode connected to the gate electrode of the first transistor T1, a second electrode connected to the second electrode of the first transistor T1, and a gate electrode connected with the scan line GCLi. The third transistor T3 may be turned on in response to the scan signal GCi received through the scan line GCLi, and connect the gate electrode to the second electrode of the first transistor T1, such that the first transistor T1 is diode-connected.

The fourth transistor T4 includes a first electrode connected to the gate electrode of the first transistor T1, a second electrode connected to the third driving voltage line VL3 for transmitting the first initialization voltage VINT1 and a gate electrode connected to the scan line GILi. The fourth transistor T4 may be turned on in response to the scan signal Gli received through the scan line GILi to perform an initialization operation for transmitting the first initialization voltage VINT1 to the gate electrode of the first transistor T1 to initialize the voltage of the gate electrode of the first transistor T1.

The fifth transistor T5 may include a first electrode connected to the first driving voltage line VL1, a second electrode connected to the first electrode of the first transistor T1, and a gate electrode connected to the light emitting line EMLi.

The sixth transistor T6 may include a first electrode connected to the second electrode of the first transistor T1, a second electrode connected to the anode of the light emitting element ED, and a gate electrode connected to the light emitting line EMLi.

The fifth transistor T5 and the sixth transistor T6 may be simultaneously turned on in response to the light emitting signal EMi received through the light emitting line EMLi. Accordingly, the first driving voltage ELVDD may be compensated through the first transistor T1 which is diode-connected and transmitted to the light emitting element ED.

The seventh transistor T7 includes a first electrode connected to the second electrode of the sixth transistor T6, a second electrode connected to the fourth driving voltage line VLA, and a gate electrode connected to the scan line GWLi+1. The seventh transistor T7 is turned on in response to the scan signal GWi+1 received through the scan line GWLi+1 and bypasses a current of the anode of the light emitting element ED to the fourth driving voltage line VL4. One terminal of the capacitor Cst is connected to the gate electrode of the first transistor T1, as described above, and another terminal of the capacitor Cst is connected to the first driving voltage line VL1. A cathode of the light emitting element ED may be connected to the second driving voltage line VL2 which transmits the second driving voltage ELVSS. According to an embodiment, the structure of the pixel PX is not limited to the structure illustrated in FIG. 2. For example, the number of transistors included in one pixel PX, the number of capacitors included in the pixel PX, and the connection relationship between the transistors and the capacitors may be variously modified.

Figure 3:
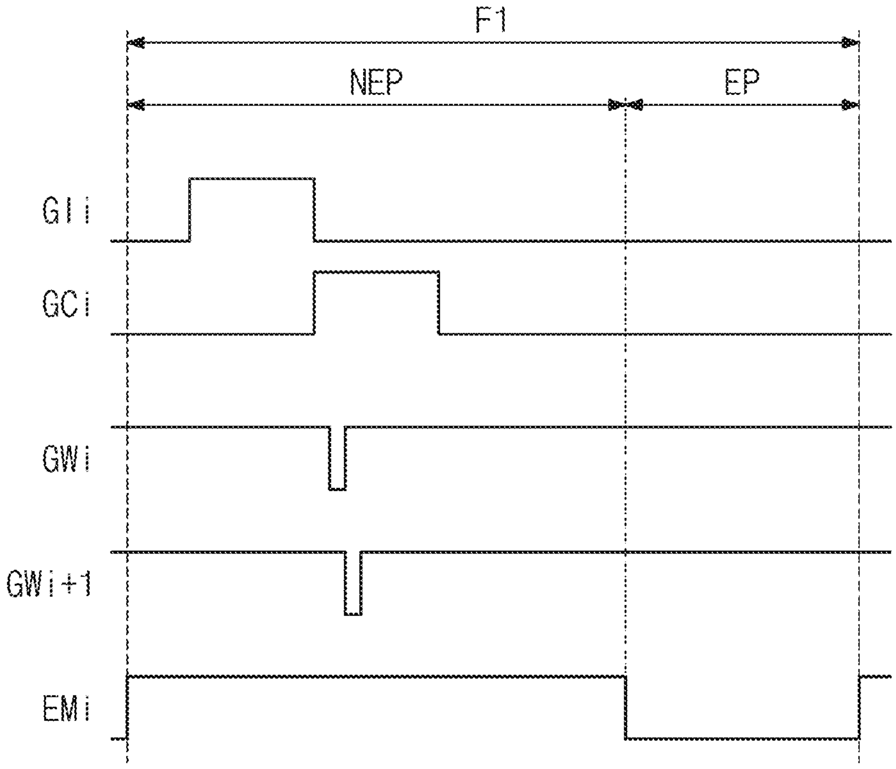
FIG. 3 is a timing diagram illustrating the operation of a pixel illustrated in FIG. 2 according to an embodiment of the present disclosure.

FIG. 3 is a timing diagram illustrating the operation of a pixel illustrated in FIG. 2 according to an embodiment of the present disclosure.

Referring to FIGS. 2 and 3, when the scan signal GIi having a high level is applied through the scan line GILi during an initialization period of one frame F1, the fourth transistor T4 is turned on. The first initialization voltage VINT1 is transmitted to the gate electrode of the first transistor T1 through the fourth transistor T4, which is turned on, and the gate electrode of the first transistor T1 is initialized by the first initialization voltage VINT1.

Next, when the scan signal GCi having the high level is applied through the scan line GCLi during a compensation period of one frame F1, the third transistor T3 is turned on. The compensation period may be in a non-overlap state with the initialization period.

The first transistor T1 is diode-connected by the third transistor T3 turned on during the compensation period and biased forward. In addition, the compensation period may be overlapped with a data write period in which the scan signal GWi is activated in a low level.

During the data write period, the second transistor T2 is turned on by the scan signal GWi having the low level. In the case, a compensation voltage, which is obtained by reducing the voltage of the data signal Dj provided through the data line DLj by a threshold voltage of the first transistor T1, is applied to the gate electrode of the first transistor T1. In other words, the potential of the gate electrode of the first transistor T1 may be a compensation voltage.

As the first driving voltage ELVDD and the compensation voltage are respectively applied to opposite terminals of the capacitor Cst, charges corresponding to a difference in voltage between the opposite terminals may be stored in the capacitor Cst.

Meanwhile, the seventh transistor T7 is turned on by receiving the second write scan signal GWLi+1 having the low level through the scan line GWLi+1. As the seventh transistor T7 is turned on, the anode of the light emitting element ED may be initialized by the second initialization voltage VINT2.

Next, the light emitting signal EMi supplied from the light emitting line EMLi is changed from the high level to the low level. The fifth transistor T5 and the sixth transistor T6 are turned on by the light emitting signal EMi having the low level. Then, the driving current Id is generated due to the voltage difference between the gate voltage of the gate electrode of the first transistor T1 and the first driving voltage ELVDD, and is applied to the light emitting element ED through the sixth transistor T6 such that the driving current Id flows through the light emitting element ED.

A period in which the light emitting signal EMi is maintained to be in the high level is a period in which the light emitting element ED is maintained to be in a non-emission state, so the period in which the light emitting signal EMi is maintained to be in the high level may be referred to as a non-emission period NEP. In addition, a period in which the light emitting signal EMi is maintained to be in the low level is a period in which the light emitting element ED is maintained to be in an emission state, so the period in which the light emitting signal EMi is maintained to be in the low level may be referred to as an emission period EP.

Figure 4:
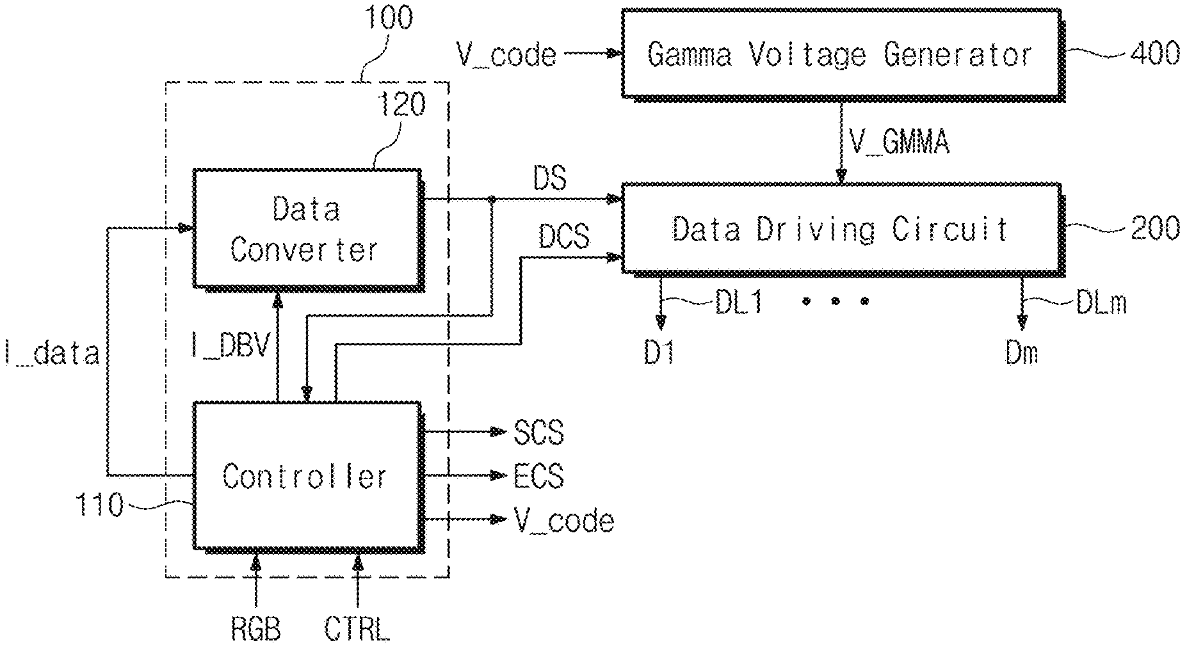
FIG. 4 is a block diagram of a driving controller according to an embodiment of the present disclosure.

FIG. 4 is a block diagram illustrating the driving controller 100 according to an embodiment of the present disclosure.

Referring to FIG. 4, the driving controller 100 may include a controller 110 and a data converter 120. The controller 110 receives the input image signal RGB and the control signal CTRL. The controller 110 generates input data I_data by transforming (i.e., converting) a data format of the input image signal RGB such that the input image signal RGB is suitable for the display panel DP (see FIG. 1). In an embodiment, the input image signal RGB may be converted to grayscale. The generated input data I_data is provided to the data converter 120. According to an embodiment, the input image signal RGB may include a red image signal, a green image signal, and a blue image signal.

The controller 110 generates the scan control signal SCS, the data control signal DCS, and the light emitting control signal ECS in response to the control signal CTRL. The scan control signal SCS, the data control signal DCS, and the light emitting control signal ECS may be provided to the scan driving circuit SDC, the data driving circuit 200, and the light emitting driving circuit EDC, respectively. The controller 110 may further output the voltage code value V_code, based on the output data signal DS.

The controller 110 may provide an input dimming code value I_DBV, which is preset, to the data converter 120. The input dimming code value I_DBV may be a value set such that the display device DD displays an image corresponding to a target brightness level. According to an embodiment, the input dimming code value I_DBV may be determined based on dimming information input by a user.

The input dimming code value I_DBV may be one value selected from among a plurality of dimming values. According to an embodiment of the present disclosure, the input dimming code value I_DBV may be a digital value. For example, the input dimming code value I_DBV may be an 8-bit signal.

The data converter 120 may output the output data signal DS to the data driving circuit 200 by correcting (i.e., modifying) the input data I_data based on the input dimming code value I_DBV. The modifying of the input data I_data based on the input dimming conde value I_DBV will be described with reference to FIG. 7. According to an embodiment of the present disclosure, the output data signal DS may include a red output data, a green output data, and a blue output data.

The gamma voltage generator 400 may generate the plurality of gamma voltages V_GMMA depending on the voltage code value V_code provided from the driving controller 100. The gamma voltage generator 400 may output the plurality of gamma voltages V_GMMA to the data driving circuit 200.

The gamma voltage generator 400 may determine a voltage level of a first gamma reference voltage (or a bottom reference voltage) and a second gamma reference voltage (or a top reference voltage), depending on the voltage code value V_code. The voltage code value V_code may include a bottom voltage code value for determining a voltage level of the first gamma reference voltage and a top voltage code value for determining a voltage level of the second gamma reference voltage. According to an embodiment of the present disclosure, the voltage code value V_code may be a digital value.

The voltage level of each of the plurality of gamma voltages V_GMMA may be determined by using the first gamma reference voltage and the second gamma reference voltage. For example, the each of the plurality of gamma voltages V_GMMA may be equal to or higher than the first gamma reference voltage, and equal to or lower than the second gamma reference voltage.

The data driving circuit 200 may convert the output data signal DS into the data signals D1 to Dm, based on the plurality of gamma voltages V_GMMA, and may apply the data signals D1 to Dm to the data lines DL1 to DLm (see FIG. 1) of the display panel DP (see FIG. 1).

Figure 5:
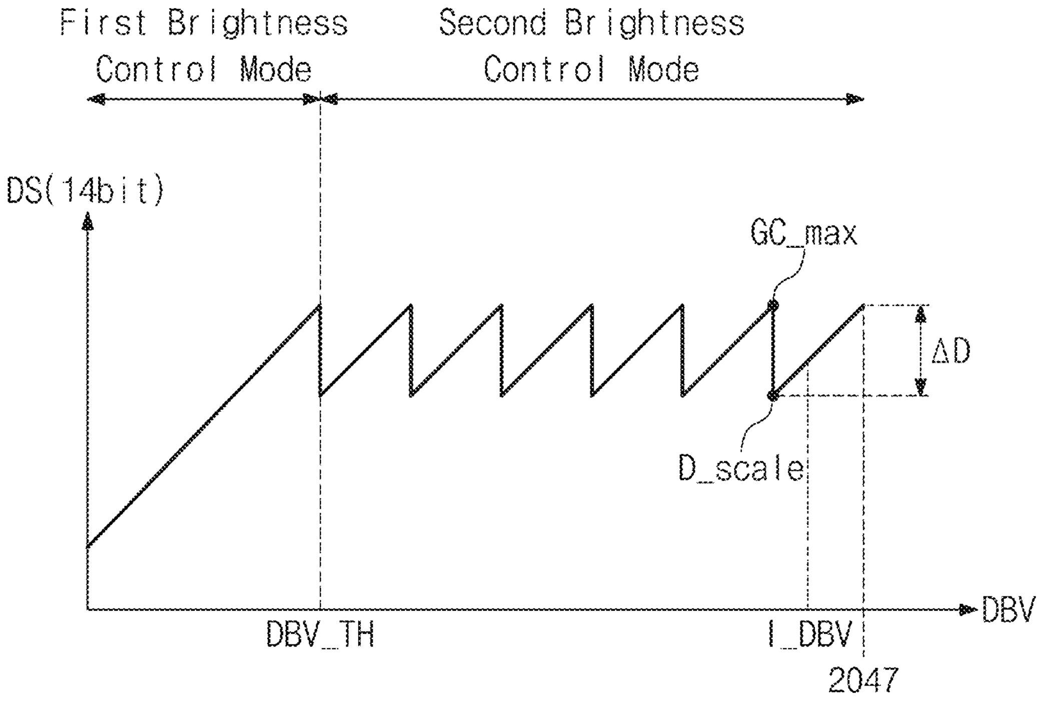
FIG. 5 is a view illustrating operating modes of a driving controller based on an input dimming code value according to an embodiment of the present disclosure.

FIG. 5 is a view illustrating operating modes of the driving controller 100 based on the input dimming code value I_DBV.

In a graph illustrated in FIG. 5, a horizontal axis is the dimming code value DBV, and a vertical axis is the output data signal DS. According to an embodiment, the output data signal DS may be a 14-bit digital value.

Referring to FIGS. 4 and 5, the controller 110 of the driving controller 100 may compare the input dimming code value I_DBV with a reference dimming code value DBV_TH, and may determine the operating mode based on the comparison result.

When the input dimming code value I_DBV is smaller than the reference dimming code value DBV_TH, the controller 110 may determine the operating mode to the first brightness control mode. In the first brightness control mode, the controller 110 may adjust the pulse width of the non-emission period NEP of the light emitting signal EMi illustrated in FIG. 3. In other words, the controller 110 generates the light emitting control signal ECS for adjusting the pulse width of the non-emission period NEP of the light emitting signal EMi.

When the input dimming code value I_DBV is greater than the reference dimming code value DBV_TH, the controller 110 may determine the operating mode to the second brightness control mode. In the second brightness control mode, the controller 110 provides the input dimming code value I_DBV to the data converter 120. In the second brightness control mode, the data converter 120 performs a dimming operation on the input data I_data and outputs the output data signal DS.

The controller 110 may compare the highest dimming grayscale value (or referred to as a dimming scale value D_scale) of the output data signal DS after the dimming operation with the highest gray value (hereinafter, referred to as the highest reference grayscale value GC_max) of the output data signal DS before the dimming operation to update the voltage code value V_code (for example, a bottom voltage code value) to a new value. The highest dimming grayscale value D_scale may be defined as the highest grayscale value of the output data signal DS which may be expressed based on the input dimming code value I_DBV. The highest reference grayscale value GC_max may be preset to the highest dimming grayscale value which may be expressed through the output data signal DS (or determined based on the highest dimming code value among the plurality of dimming code values), before the dimming operation.

The controller 110 determines whether to update the voltage code value V_code by determining whether a difference AD between the highest dimming grayscale value D_scale and the highest reference gray value GC_max is greater than a preset reference difference. In detail, the controller 110 updates the voltage code value V_code when the difference AD between the highest dimming grayscale value D_scale and the highest reference gray value GC_max is greater than the reference difference, and maintains the voltage code value V_code when the difference AD between the highest dimming grayscale value D_scale and the highest reference gray value GC_max is less than or equal to the reference difference. The voltage code value V_code before the update may be referred to as a first voltage code value, and the voltage code value V_code after the update may be referred to as a second voltage code value.

According to an embodiment, the difference AD may indicate the number of bits. For example, the difference AD may be 1 bit. The controller 110 may update the first voltage code value to the second voltage code value, when the difference AD between the highest dimming grayscale value D_scale and the highest reference gray value GC_max is greater than 1 bit. Thereafter, the updated second voltage code value is provided to the gamma voltage generator 400, and the gamma voltage generator 400 adjusts the voltage level of the first gamma reference voltage (that is., bottom reference voltage) based on the second voltage code value. For example, on the assumption that the first gamma reference voltage has a voltage level of about 2.652 V when the first voltage code value is provided, when the second voltage code value is provided, the updated first gamma reference voltage may have a voltage level of about 3.409 V.

The gamma voltage generator 400 updates the plurality of gamma voltages V_GMMA based on the updated first gamma reference voltage. Accordingly, even if the grayscale level of the output data signal DS is lost by the input dimming code value I_DBV, the data driving circuit 200 generates the data signals D1 to Dm based on the plurality of updated gamma voltages V_GMMA, such that the grayscale level loss greater than or equal to a preset reference value may not occur in the data signals DI to Dm provided to the display panel DP.

Figure 6A:
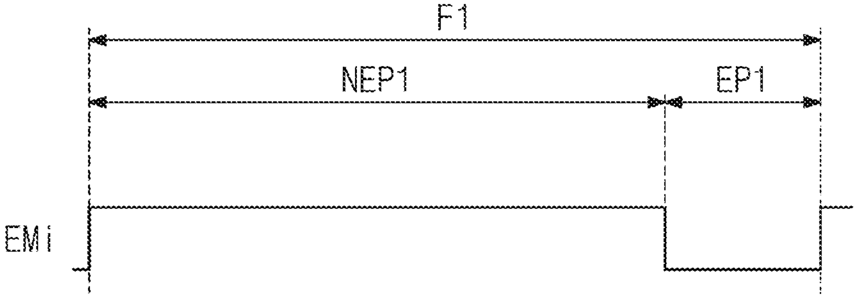
FIGS. 6A, 6B, and 6C are views illustrating a light emitting signal in a first brightness control mode according to an embodiment of the present disclosure.
Figure 6B:
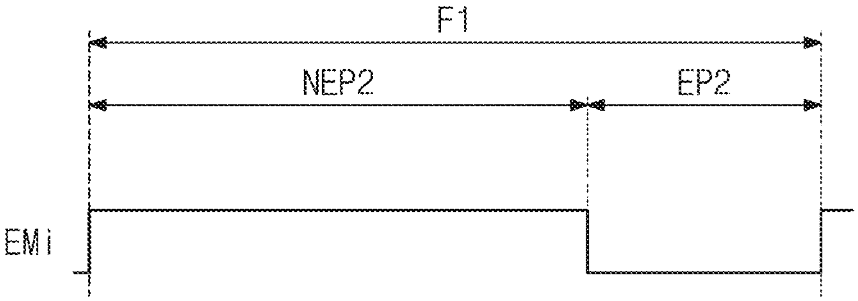
Figure 6C:
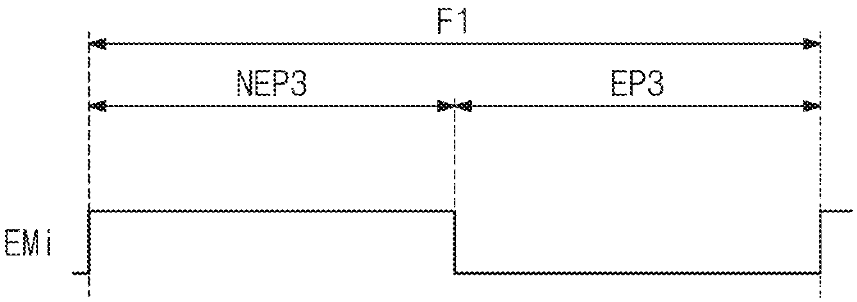

FIGS. 6A, 6B, and 6C are views illustrating the light emitting signal EMi in the first brightness control mode.

Referring to FIGS. 4, 6A, 6B, and 6C, the controller 110 may adjust the pulse width of the light emitting signal EMi in the first brightness control mode.

The times of the non-light emitting periods NEP1, NEP2, and NEP3 of the light emitting signal EMi in one frame F1 may have a relationship of NEP1>NEP2>NEP3.

The times of the light emitting periods EP1, EP2, and EP3 of the light emitting signal EMi in one frame F1 may have a relationship of EP1<EP2<EP3.

As the times of the non-light emitting periods NEP1, NEP2, and NEP3 are increased, in other words, the times of the light emitting periods EP1, EP2, and EP3 are decreased, a time for light emitting of the light emitting element ED (see FIG. 2) is decreased. Therefore, the brightness of the pixel PX (see FIG. 2) may be decreased.

To the contrary, as the times of the non-light emitting periods NEP1, NEP2, and NEP3 are decreased, in other words, the times of the light emitting periods EP1, EP2, and EP3 are increased, a time for light emitting of the light emitting element ED (see FIG. 2) is increased. Therefore, the brightness of the pixel PX (see FIG. 2) may be increased.

For example, the input dimming code value I_DBV may be preset depending on the dimming information input by the user. When the input dimming code value I_DBV is smaller than the reference dimming code value DBV_TH (see FIG. 5), the driving controller 100 is operated in the first brightness control mode.

In the first brightness control mode, the controller 110 may adjust the brightness of the pixel PX by adjusting the pulse width of the light emitting signal EMi, as illustrated in FIGS. 6A, 6B, and 6C depending on the input dimming code value I_DBV.

However, adjusting the driving current Id (see FIG. 2) provided to the entire pixels PX of the display panel DP (see FIG. 1) in the first brightness control mode may degrade the current-to-light characteristics (for example, chromaticity difference) of the light emitting element ED (see FIG. 2).

Figure 7:
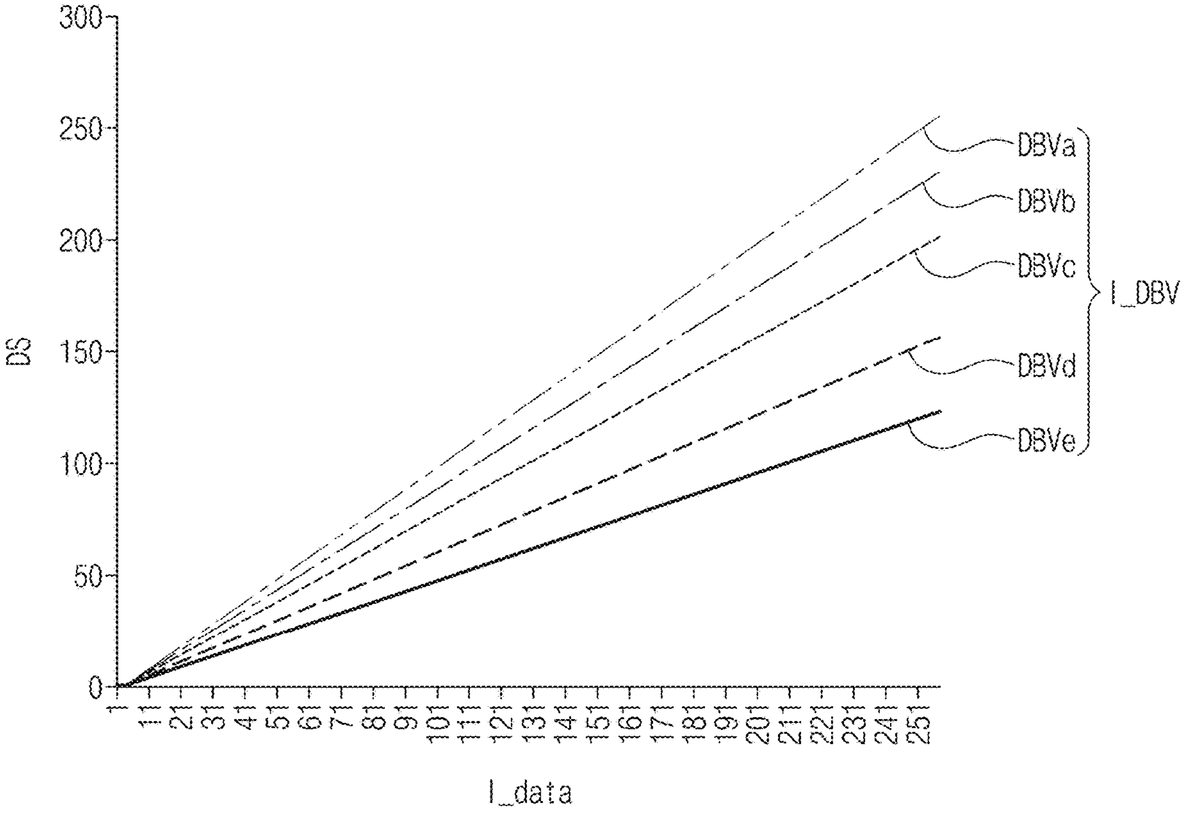
FIG. 7 is a view illustrating the relationship between input data and an output data signal based on an input dimming code value according to an embodiment of the present disclosure.

FIG. 7 is a view illustrating the relationship between the input data I_data and the output data signal DS depending on the input dimming code value.

Referring to FIGS. 4 and 7, when the input dimming code values I_DBV are DVBa, DVBb, DVBc, DVBd, and DVBe, the output data signal DS may be varied depending on the input data I_data. In FIG. 7, the input dimming code value I_DBV has the relationship of DVBa>DVBb>DVBc>DVBe. In other words, as the input dimming code value I_DBV is decreased, the digital value of the output data signal DS corresponding to the input data I_data may be decreased.

In addition, a grayscale level may be lost, regardless of the input dimming code value I_DBV, so the grayscale level (that is, a digital value) is decreased in the higher grayscale level (for example, the grayscale of 251) of the input data I_data.

Figure 8:
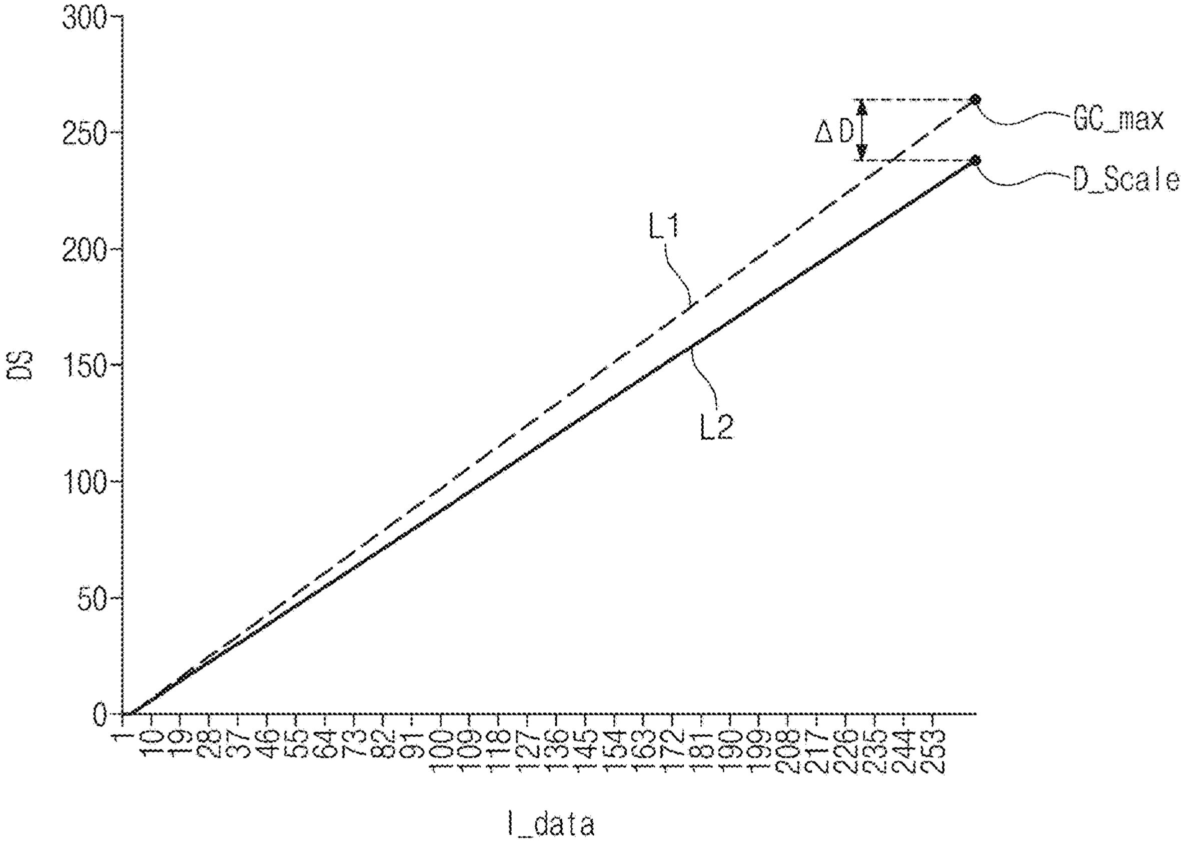
FIG. 8 is a graph illustrating the relationship between input data and an output data signal depending on a dimming code value according to an embodiment of the present disclosure.

FIG. 8 is a graph illustrating the relationship between the input data I_data and the output data signal DS depending on the dimming code value. FIG. 8 illustrates that a first line L1 represents the relationship between the input data I_data and the output data signal DS before dimming. A second line L2 represents the relationship between the input data I_data and the output data signal DS after dimming, depending on the input dimming code value I_DBV.

Referring to FIGS. 4 and 8, the controller 110 may compare the dimming scale value D_scale of the output data signal DS after dimming with the highest reference grayscale value GC_max of the output data signal DS before dimming to update the voltage code value V_code (for example, the bottom voltage code value).

The controller 110 determines whether to update the voltage code value V_code by determining whether the difference AD between the highest dimming grayscale value D_scale and the highest reference gray value GC_max is greater than a preset reference difference. In detail, the controller 110 may update the voltage code value V_code when the difference AD between the highest dimming grayscale value D_scale and the highest reference gray value GC_max is greater than the reference difference. In addition, the controller 110 maintains the voltage code value V_code when the difference AD between the highest dimming grayscale value D_scale and the highest reference gray value GC_max is less than or equal to the reference difference. In this case, the voltage code value V_code before the update may be referred to as a first voltage code value, and the voltage code value V_code after the update may be referred to as a second voltage code value.

According to an embodiment, the difference AD may indicate the number of bits. For example, the difference AD may be one bit. The controller 110 may update the first voltage code value to the second voltage code value, when the difference AD between the highest dimming grayscale value D_scale and the highest reference gray value GC_max is greater than one bit. Thereafter, the updated second voltage code value is provided to the gamma voltage generator 400, and the gamma voltage generator 400 adjusts the voltage level of the first gamma reference voltage (in other words., bottom reference voltage) based on the second voltage code value.

The gamma voltage generator 400 updates the plurality of gamma voltages V_GMMA based on the updated first gamma reference voltage. Accordingly, even if the grayscale level of the output data signal DS is lost by the input dimming code value I_DBV, the data driving circuit 200 may generate the data signals D1 to Dm based on the plurality of updated gamma voltages V_GMMA. Accordingly, even if the grayscale level (in other words, the digital value) of the output data signal DS is decreased at a higher grayscale level (for example, the grayscale level of 253) of the input data I_data, the grayscale level may be compensated by the plurality of gamma voltages V_GMMA.

Figure 9:
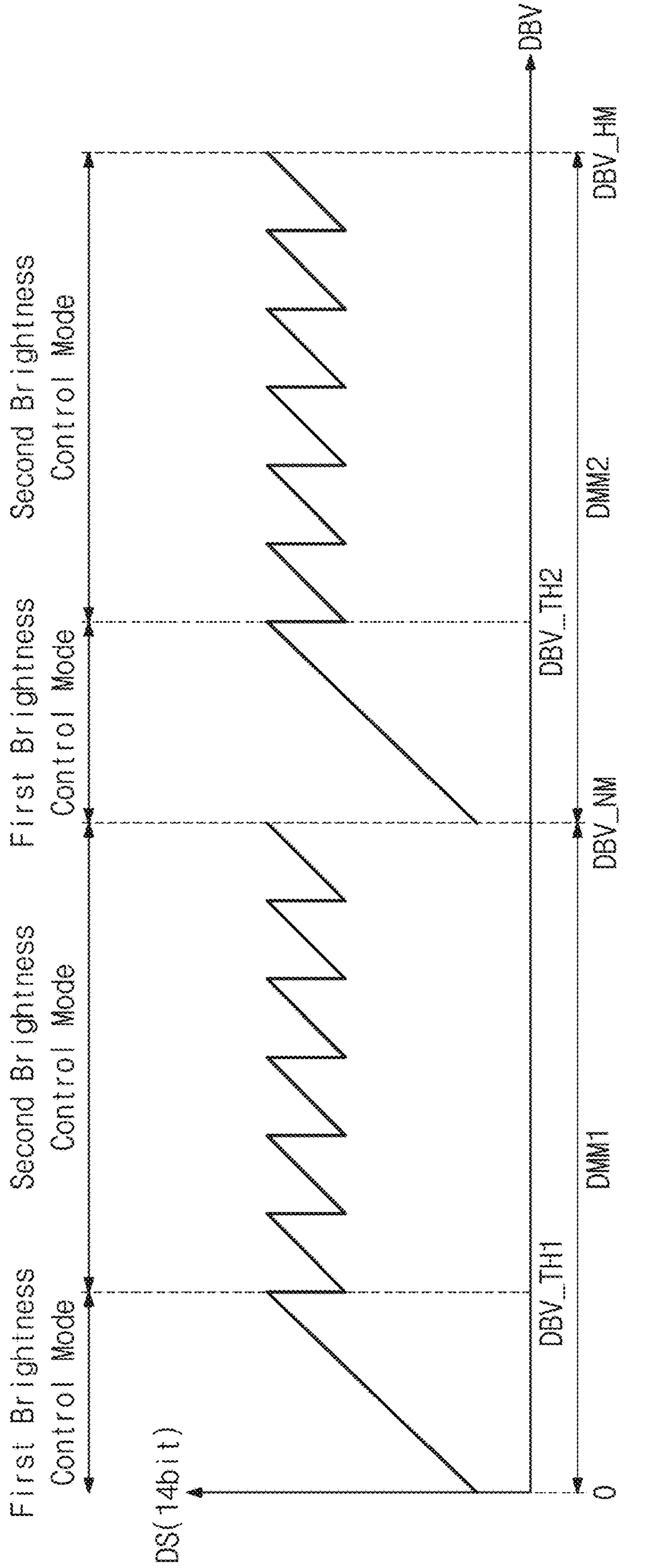
FIG. 9 is a view illustrating operating modes of a driving controller according to an embodiment of the present disclosure.

FIG. 9 is a view illustrating operating modes of the driving controller 100 according to an embodiment of the present disclosure.

In a graph illustrated in FIG. 9, a horizontal axis is the dimming code value DBV, and the vertical axis is the output data signal DS. According to an embodiment, the output data signal DS may be a 14-bit digital value.

Referring to FIGS. 4 and 9, the controller 110 of the driving controller 100 determines whether the input dimming code value I_DBV is included in a first dimming section DMM1 (i.e., a first dimming range) or a second dimming section DMM2 (i.e., a second dimming range). For example, the controller 110 may determine whether the input dimming code value I_DBV corresponds to a value within one of the first dimming section DMM1 and the second dimming section DMM2.

When the input dimming code value I_DBV is a value in the range from '0' to a first max code value DBV_NM, the input dimming code value I_DBV may be included in the first dimming section DMM1. For example, the first max code value DBV_NM may be a normal max dimming code value, that is, '2047'.

When the input dimming code value I_DBV is included in the first dimming section DMM1, the controller 110 may compare the input dimming code value I_DBV with a first reference dimming code value DBV_TH1 and may determine the operating mode, based on the comparison result. The first reference dimming code value DBV_TH1 may be one of a plurality of dimming code values included in the first dimming section DMM1.

When the input dimming code value I_DBV is smaller than the first reference dimming code value DBV_TH1, the controller 110 may determine the operating mode to the first brightness control mode. In the first brightness control mode, the controller 110 may adjust the pulse width of the non-emission period NEP of the light emitting signal EMi as illustrated in FIG. 3. In other words, the controller 110 generates the light emitting control signal ECS for adjusting the pulse width of the non-emission period NEP of the light emitting signal EMi.

When the input dimming code value I_DBV is greater than the first reference dimming code value DBV_TH1, the controller 110 may determine the operating mode to the second brightness control mode. In the second brightness control mode, the controller 110 provides the input dimming code value I_DBV to the data converter 120. In the second brightness control mode, the data converter 120 performs a dimming operation on the input data I_data and outputs the output data signal DS.

The controller 110 may update the voltage code value V_code by comparing the dimming scale value D_scale (see FIG. 5) of the output data signal DS after diming with the highest reference grayscale value GC_max (see FIG. 5) of the output data signal DS before diming.

When the input dimming code value I_DBV is a value in the range from the first max code value DBV_NM to a second max code value DBV_HM, the input dimming code value I_DBV may be included in the second dimming section DMM2. For example, the second max code value DBV_HM may be the higher max dimming code value, that is, '4094'.

When the input dimming code value I_DBV is included in the second dimming section DMM2, the controller 110 may compare the input dimming code value I_DBV with a second reference dimming code value DBV_TH2 and may determine the operating mode, based on the comparison result. The second reference dimming code value DBV_TH2 may be one of a plurality of dimming code values included in the second dimming section DMM2.

When the input dimming code value I_DBV is smaller than the second reference dimming code value DBV_TH2, the controller 110 may determine the operating mode to the first brightness control mode. In the first brightness control mode, the controller 110 may adjust the pulse width of the non-emission period NEP of the light emitting signal EMi illustrated in FIG. 3. In other words, the controller 110 generates the light emitting control signal ECS for adjusting the pulse width of the non-emission period NEP of the light emitting signal EMi.

When the input dimming code value I_DBV is greater than the second reference dimming code value DBV_TH2, the controller 110 may determine the operating mode to the second brightness control mode. In the second brightness control mode, the controller 110 provides the input dimming code value I_DBV to the data converter 120. In the second brightness control mode, the data converter 120 performs a dimming operation on the input data I_data and outputs the output data signal DS.

The controller 110 may update the voltage code value V_code by comparing the dimming scale value D_scale (see FIG. 5) of the output data signal DS after dimming with the highest reference grayscale value GC_max (see FIG. 5) of the output data signal DS before dimming.

In the second brightness control mode, the pulse widths of the light emitting signals provided to the light emitting lines EML1 to EMLn may be maintained at a preset value.

The driving controller 100 may minimize operating in the first brightness control mode through the operation as illustrated in FIG. 9. For example, as the change in the pulse width of the light emitting signals applied to the light emitting lines EML1 to EMLn is minimized, the degradation of the current-to-optical characteristics (for example, chromaticity difference) of the light emitting element ED (see FIG. 2) may be minimized.

Although only two dimming sections, which are the first dimming section DMM1 and the second dimming section DMM2, are illustrated in FIG. 9, the present disclosure is not limited thereto. The dimming sections may be multiple dimming sections of at least two dimming sections. For example, when three dimming sections are provided, the number of reference dimming code values may be '3'. In other words, the controller 110 of the driving controller 100 may compare the input dimming code value I_DBV with the reference dimming code values corresponding to each of the dimming sections, and determine the operating mode according to the comparison result.

Figure 10A:
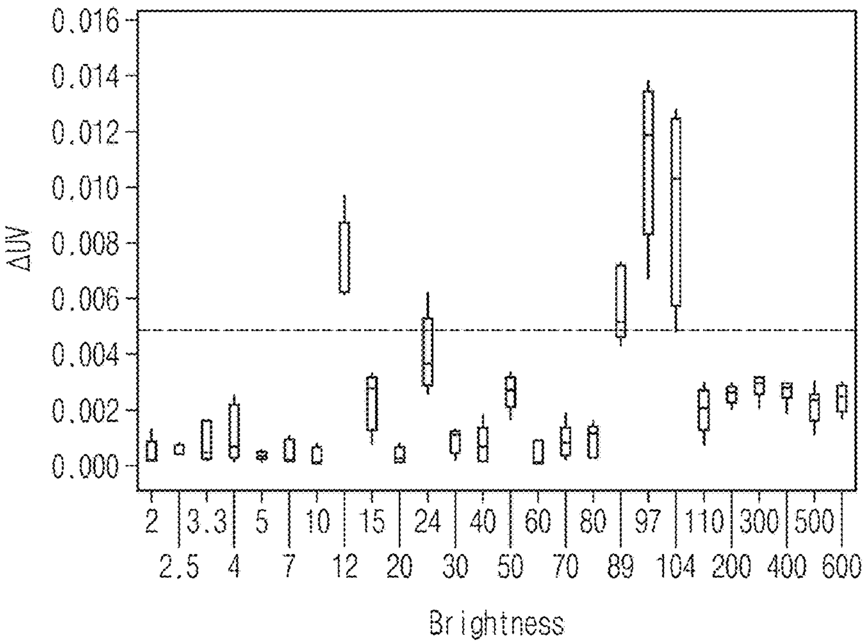
FIGS. 10A and 10B are views illustrating a chromaticity difference according to brightness according to an embodiment of the present disclosure.
Figure 10B:
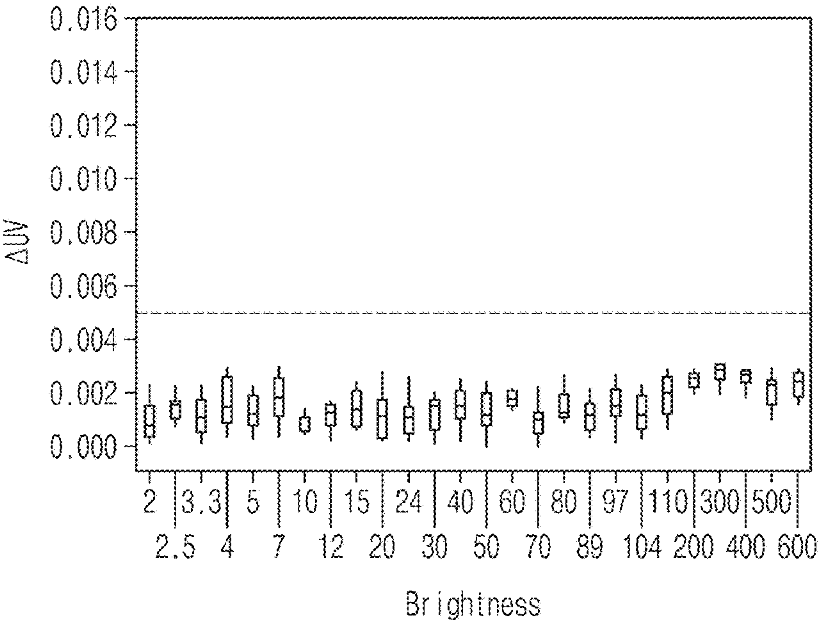

FIGS. 10A and 10B are views illustrating a chromaticity difference according to brightness.

In FIGS. 10A and 10B, a horizontal axis represents the brightness (or brightness level) of the image displayed on the display device DD (see FIG. 1), and a vertical axis represents the chromaticity difference (AUV).

FIG. 10A is a view illustrating a chromaticity difference depending on brightness when the driving controller 100 uses only one reference dimming code value.

FIG. 10B is a view illustrating a chromaticity difference depending on the brightness when the driving controller 100 uses the first reference dimming code value DBV_TH1 and the second reference dimming code value DBV_TH2, as illustrated in FIG.9.

According to an embodiment, the chromaticity difference AUV of the display device DD is preferably 0.005 or less.

When comparing FIGS. 10A and 10B, it may be recognized that chromaticity difference depending on brightness may be minimized when the driving controller 100 employs the first reference dimming code value DBV_TH1 and the second reference dimming code value DBV_TH2 as a reference dimming code value.

Figure 11:
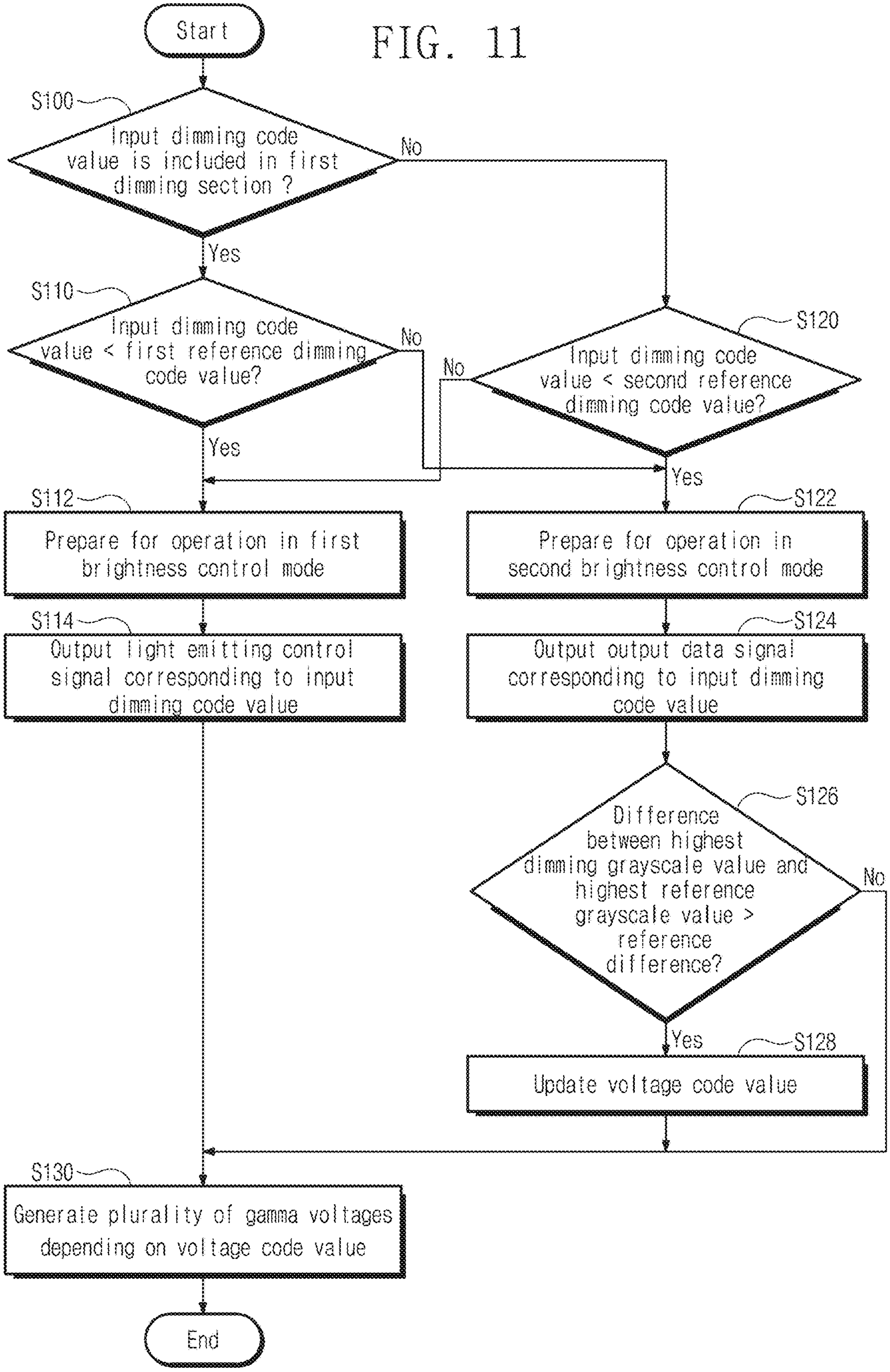
FIG. 11 is a flowchart illustrating a method for driving a display device according to an embodiment of the present disclosure.

FIG. 11 is a flowchart illustrating a method for driving a display device according to an embodiment of the present disclosure.

Referring to FIGS. 1, 4, 9, and 11, the driving controller 100 of the display device DD may compensate for the input data I_data based on the input dimming code value I_DBV and output the output data signal DS.

In detail, the controller 110 of the driving controller 100 determines whether the input dimming code value I_DBV is included in the first dimming section DMM1 (step S100).

When the input dimming code value I_DBV is included in the first dimming section DMM1, the controller 110 may compare the input dimming code value I_DBV with the first reference dimming code value DBV_TH1 (S110) According to an embodiment, the first reference dimming code value DBV_TH1 may be a dimming code value included in the first dimming section DMM1.

When the input dimming code value I_DBV is less than the first reference dimming code value DBV_TH1, the controller 110 may determine the operating mode to the first brightness control mode, and prepare for the operation in the first brightness control mode (S112). For example, the controller 110 may set the pulse width of the non-emission period NEP of the light emitting signal EMi to correspond to the input dimming code value I_DBV.

The controller 110 generates the light emitting control signal ECS for adjusting the pulse width of the non-emission period NEP of the light emitting signal Emi (S114).

In S110, when the input dimming code value I_DBV is equal to or greater than the first reference dimming code value DBV_TH1, the controller 110 may determine the operating mode to the second brightness control mode, and prepare for the operation in the second brightness control mode (S122). In the second brightness control mode, the controller 110 provides the input dimming code value I_DBV to the data converter 120

In the second brightness control mode, the data converter 120 performs a dimming operation for the input data I_data and outputs the output data signal DS (S124).

The controller 110 may determine whether the difference AD (see FIG. 8) between the dimming scale value D_scale (see FIG. 8) of the output data signal DS after dimming with the highest reference grayscale value GC_max (see FIG. 8) of the output data signal DS before dimming is greater than the preset reference difference (S126).

When the difference AD between the highest dimming grayscale value D_scale and the highest reference gray value GC_max is greater than the reference difference, the controller 110 may update the voltage code value V_code (S128).

When the difference AD between the highest dimming grayscale value D_scale and the highest reference gray value GC_max is less than or equal to the reference difference, the controller 110 may maintain the voltage code value V_code.

The gamma voltage generator 400 may set a voltage level of a first gamma reference voltage (or a bottom reference voltage) depending on the voltage code value V_code, and generate the plurality of gamma voltages V_GMMA (S130).

The data driving circuit 200 may generate the data signals DI to Dm based on the plurality of gamma voltages V_GMMA updated.

When the input dimming code value I_DBV is not included in the first dimming section DMM1 in S100, that is, when the input dimming code value I_DBV is included in the second dimming section DMM2, the controller 110 may compare the input dimming code value I_DBV with the second reference dimming code value DBV_TH2 (S120)

When the input dimming code value I_DBV is less than the second reference dimming code value DBV_TH2, the controller 110 may determine the operating mode to the first brightness control mode, and prepare for the operation in the first brightness control mode (S112). The operation in the first brightness control mode has been already described above.

When the input dimming code value I_DBV is equal to or greater than the second reference dimming code value DBV_TH2, the controller 110 may determine the operating mode to the second brightness control mode, and prepare for the operation in the second brightness control mode (S122). The operation in the second brightness control mode has been already described above.

According to the present disclosure, the display device may operate in the first brightness mode for adjusting the pulse width of the light emitting control signal and the second brightness mode for changing the grayscale level of the output data, depending on the dimming code value.

According to the present disclosure, the display device may minimize the operating duration in the first brightness mode. Accordingly, the degradation of the display quality due to the change of the pulse width of the light emitting control signal may be prevented.

Although an embodiment of the present disclosure has been described for illustrative purposes, those skilled in the art will appreciate that various modifications, and substitutions are possible, without departing from the scope and spirit of the invention as disclosed in the accompanying claims. Accordingly, the technical scope of the present disclosure is not limited to the detailed description of this specification, but should be defined by the claims.

What is claimed is:

1. A display device comprising:
a display panel;
a driving controller configured to modify an input image signal, output an output data signal, and generate a light emitting control signal;
a data driving circuit configured to convert the output data signal into a data signal based on a plurality of gamma voltages and apply the data signal to the display panel; and
a light emitting driving circuit configured to provide a light emitting signal to the display panel in response to the light emitting control signal,
wherein the driving controller is configured to:
determine whether an input dimming code value is within one of a plurality of dimming ranges including a first dimming range and a second dimming range,
compare, in response to determining of the input dimming code value being within the first dimming range, the input dimming code value with a first reference dimming code value and operate in one of a first brightness control mode and a second brightness control mode depending on a comparison result of the input dimming code value and the first reference dimming code value,
compare, in response to determining of the input dimming code value within the second dimming range, the input dimming code value with a second reference dimming code value and operate in one of the first brightness control mode and the second brightness control mode depending on a comparison result of the input dimming code value and the second reference dimming code value,
output the light emitting control signal for adjusting a pulse width of the light emitting signal in the first brightness control mode, and
output the output data signal by modifying the input image signal based on the input dimming code value in the second brightness control mode.

2. The display device of claim 1, further comprising:
a gamma voltage generator to generate the plurality of gamma voltages in response to a first voltage code value,
wherein the driving controller is configured to generate the first voltage code value based on the output data signal,
wherein the first voltage code value includes a bottom voltage code value for determining a voltage level of a first gamma reference voltage and a top voltage code value for determining a voltage level of a second gamma reference voltage, and
wherein the plurality of gamma voltages are between the first gamma reference voltage and the second gamma reference voltage.

3. The display device of claim 2,
wherein the driving controller is configured to:
update the first voltage code value to a second voltage code value based on a difference between a highest dimming grayscale value of the output data signal and a preset highest reference grayscale value in the second brightness control mode.

4. The display device of claim 3,
wherein the driving controller is configured to:
update the first voltage code value to the second voltage code value in response to the difference between the highest dimming grayscale value and the preset highest reference grayscale value being greater than a preset reference difference.

5. The display device of claim 3,
wherein the driving controller is configured to:
maintain the first voltage code value in response to the difference between the highest dimming grayscale value and the preset highest reference grayscale value being equal to or smaller than a preset reference difference.

6. The display device of claim 1,
wherein the driving controller is configured to:
output the light emitting control signal to generate the light emitting signal having a pulse width corresponding to the input dimming code value in the first brightness control mode.

7. The display device of claim 1,
wherein the driving controller is configured to:
operate in the first brightness control mode in response to the input dimming code value being smaller than the first reference dimming code value, and
operate in the second brightness control mode in response to the input dimming code value being greater than or equal to the first reference dimming code value.

8. The display device of claim 1,
wherein the driving controller is configured to:
operate in the first brightness control mode in response to the input dimming code value being smaller than the second reference dimming code value, and
operate in the second brightness control mode in response to the input dimming code value being greater than or equal to the second reference dimming code value.

9. The display device of claim 1,
wherein the first reference dimming code value is one of a plurality of dimming code values included in the first dimming range, and wherein the second reference dimming code value is one of a plurality of dimming code values included in the second dimming range.

10. The display device of claim 1, wherein the display panel includes:

a pixel to operate in response to the data signal and the light emitting signal.

11. The display device of claim 1, wherein the driving controller includes:

a controller to output input data obtained by converting the input image signal to the input data in grayscale and output the input dimming code value and a voltage code value; and a data converter to output the output data signal based on the input data and the input dimming code value.

12. A method for driving a display device, the method comprising:

determining whether an input dimming code value is within one of a plurality of dimming ranges including a first dimming range and a second dimming range;

comparing, in response to determining of the input dimming code value being within the first dimming range, the input dimming code value with a first reference dimming code value;

operating, in response to a comparison result between the input dimming code value and the first reference dimming code value, in one of a first brightness control mode and a second brightness control mode;

comparing, in response to determining of the input dimming code value being within the second dimming range, the input dimming code value with a second reference dimming code value; and operating, in response to a comparison result between the input dimming code value and the second reference dimming code value, in one of the first brightness control mode and the second brightness control mode, wherein the first brightness control mode is to adjust a pulse width of a light emitting signal applied to a display panel, and wherein the second brightness control mode is to output an output data signal by modifying an input image signal based on the input dimming code value.

13. The method of claim 12, further comprising:

generating a plurality of gamma voltages in response to a first voltage code value; and converting the output data signal into a data signal based on the plurality of gamma voltages; and providing the data signal to the display panel.

14. The method of claim 13, further comprising:

updating the first voltage code value to a second voltage code value in response to a difference between a highest dimming grayscale value of the output data signal and a preset highest reference grayscale value being greater than a preset reference difference in the second brightness control mode.

15. The method of claim 14, further comprising:

maintaining the first voltage code value in response to the difference between the highest dimming grayscale value and the preset highest reference grayscale value being equal to or smaller than the preset reference difference in the second brightness control mode.

16. The method of claim 12, further comprising:

generating the light emitting signal having a pulse width corresponding to the input dimming code value in the first brightness control mode.

17. The method of claim 12, wherein the operating in one of the first brightness control mode and the second brightness control mode in response to the comparison result between the input dimming code value and the first reference dimming code value includes:

operating in the first brightness control mode in response to the input dimming code value being smaller than the first reference dimming code value, and operating in the second brightness control mode in response to the input dimming code value being greater than or equal to the first reference dimming code value.

18. The method of claim 12, wherein the operating in one of the first brightness control mode and the second brightness control mode in response to the comparison result between the input dimming code value and the second reference dimming code value includes:

operating in the first brightness control mode in response to the input dimming code value being smaller than the second reference dimming code value, and operating in the second brightness control mode in response to the input dimming code value being greater than or equal to the second reference dimming code value.

19. The method of claim 12, wherein the first reference dimming code value is one of a plurality of dimming code values included in the first dimming range, and wherein the second reference dimming code value is one of a plurality of dimming code values included in the second dimming range.

20. The method of claim 12, wherein the display panel includes a pixel to operate in response to a data signal and the light emitting signal.

* * * * *